United States Patent

[11] 3,587,446

| [72] | Inventor | Leonal P. Gardner<br>Seattle, Wash. |
|---|---|---|
| [21] | Appl. No. | 722,897 |
| [22] | Filed | Apr. 22, 1968 |
| [45] | Patented | June 28, 1971 |
| [73] | Assignee | Herfy's Corporation<br>Seattle, Wash. |

[54] HAMBURGER BUN TOASTING EQUIPMENT
11 Claims, 5 Drawing Figs.

[52] U.S. Cl. ................................................ 99/339,
99/349, 99/393, 99/399, 99/423, 99/443
[51] Int. Cl. ............................................... A47j 37/04
[50] Field of Search .......................................... 99/1, 339,
349, 393, 399, 423, 443, 448; 219/392

[56] References Cited
UNITED STATES PATENTS

| 1,573,602 | 2/1926 | Gehman | 219/392 |
| 1,697,384 | 1/1929 | Coutu | 99/349 |
| 1,878,258 | 9/1932 | Bemis | 99/339 |
| 2,004,937 | 6/1935 | Fletcher | (99/339UX) |
| 2,036,523 | 4/1936 | Freemon | 99/339X |
| 2,817,331 | 12/1957 | Kaplan et al. | (99/339UX) |
| 3,263,595 | 8/1966 | Bower | 99/349 |
| 3,483,813 | 12/1969 | Noel | 99/423X |
| 3,463,076 | 8/1969 | Keating | 99/349 |

Primary Examiner—Billy J. Wilhite
Attorney—Roy E. Mattern, Jr.

ABSTRACT: Equipment is provided to uniformly toast hamburger buns requiring only one "setting" of top and bottom halves of buns during nearly simultaneous multiple preparation of hamburgers during a specific cooking run. Top halves are arranged with their interior face down on a heated toasting grill and all halves are uniformly compressed by a lid closing to a preset bun surface compressive position. Nearby, bottom halves are arranged with their interior faces up on a sturdy tray. This tray thereafter is moved on a bias into a uniformly parallel preset bun face compressing contact above with a heated toasting grill plate.

After respective timed toasting periods each arrangement of toasted halves is ready for preparation of a resulting toasted bun hamburger. Bottom halves on the sturdy tray are moved clear on a bias of the above heated toasting grill plate. Top halves are moved to hamburger patties on an adjacent cooking grill. Respective combined top halves and hamburger patties are transferred as a "handling unit" to bottom halves completing a tray full of "ready to serve" hamburgers. Selectively, during this "minimal handling" of the principal components, i.e. two bun halves and the meat pattie, onions, relish and dressings are added in accordance with specific orders without upsetting these minimal bun handling steps.

PATENTED JUN 28 1971 3,587,446
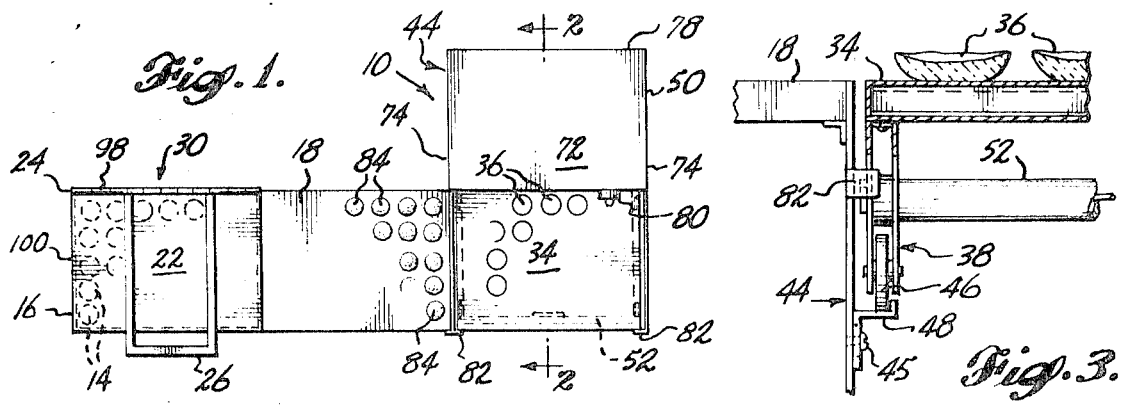
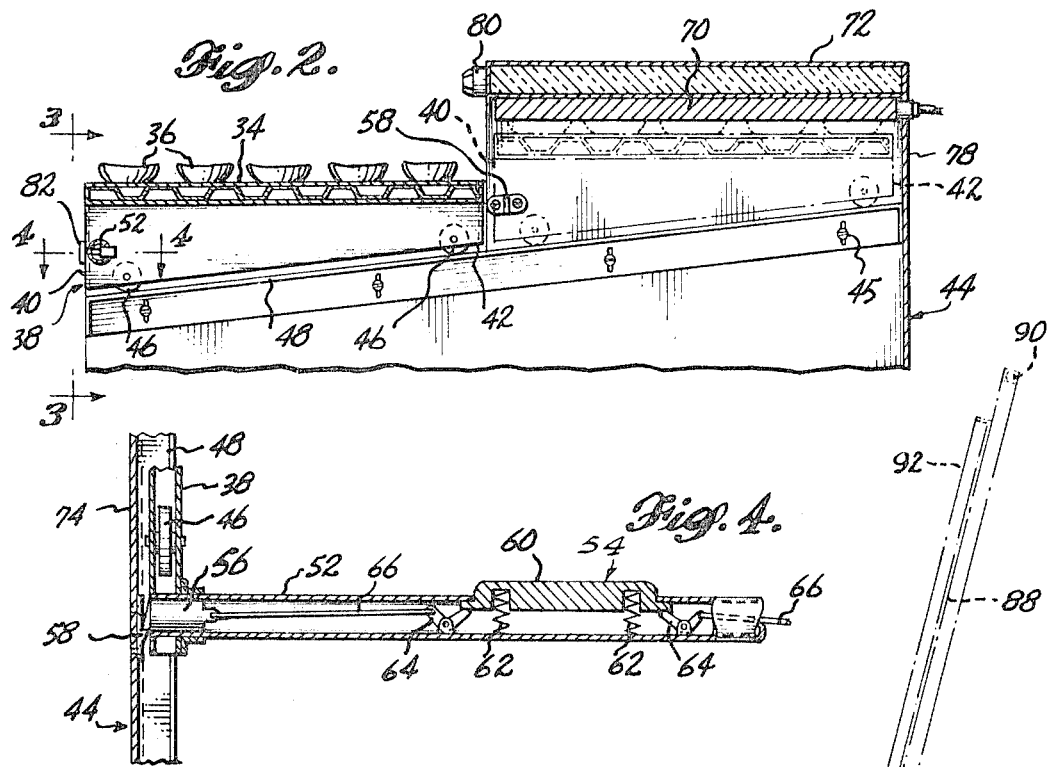
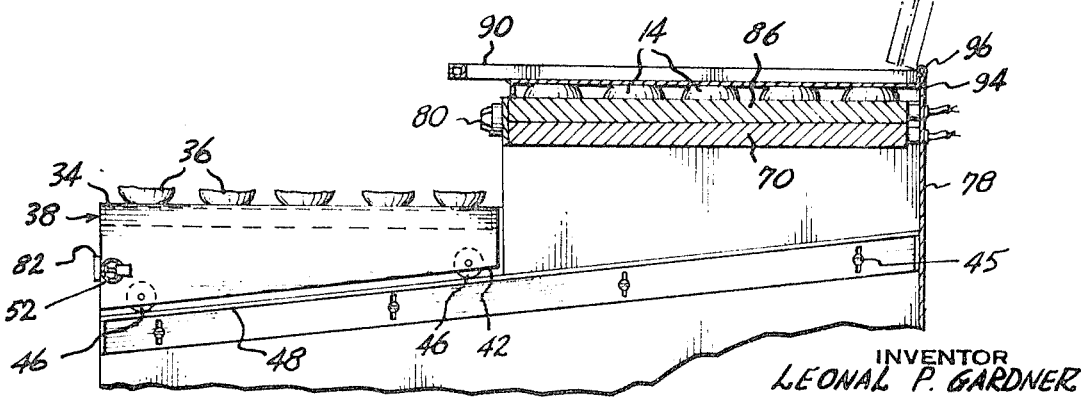
INVENTOR
LEONAL P. GARDNER
BY Roy Mattern Jr.
ATTORNEY

HAMBURGER BUN TOASTING EQUIPMENT

BACKGROUND OF INVENTION

Within limited food preparation spaces and with limited numbers of persons preparing foods, high volume production of quality hamburgers during rush hours is the "key" to successful serving on a sound economical basis, of hungry customers who are often in a hurry coming to Drive-Ins located along and nearby major arterials. All equipment and all methods, which may be used to increase efficiency in producing food and to upgrade its quality, become very important.

In this "Drive-In" service business, equipment in its embodiments of this invention very substantially reduces "-handling" time by requiring only "one setting" of each bun half. While doing so, toasting of bun halves is undertaken more completely as the interior surfaces of the bun halves are more uniformly toasted. Burned edges and nontoasted centers, in whole or in part, are avoided as preset compression toasting grill plates are utilized conveniently and timely in their locations next to a cooking grill.

SUMMARY OF INVENTION

Equipment is provided for "one setting" of hamburger bun halves to toast their exposed initially interior surfaces under preset compression while in parallel contact with toasting grill plates located nearby hamburger pattie cooking grills. Such preset compression toasting avoids burned edges and non-toasted bun centers. Equipment is arranged to commence and to continue with "one initial setting" of bun halves from "-toasting" on through to "wrapping." During the bun handling steps, respective halves are not individually turned, being only raised and transferred during preparation of each hamburger of a "batch run" of hamburgers.

Nonturning of bottom bun halves is possible, as they are toasted after their initial "one setting" through their contact with a toasting grill plate located above them. Relative movement occurs between a batch of bottom halves and this toasting grill plate above, as the distance between them is reduced. Preferably, this is done as a tray supporting bottom halves, is moved up an incline while remaining with its supporting surface in a parallel relationship to the above heated surface of the toasting grill plate. Final incline movements occur within a semienclosed space insulated to retain heat of the toasting grill elements gaining the retained heat advantage of an oven space. A positive, easily engaged and disengaged latch or stop mechanism is employed to hold the parallel movable tray in place while bottom bun halves thereon are being toasted. This latch or stop mechanism is adjusted to preset the best compression force based on a selected bun size.

DRAWINGS OF PREFERRED EMBODIMENTS

Two preferred embodiments of hamburger bun toasting equipment are illustrated in accompanying drawings, wherein:

FIG. 1 is a plan view of a hamburger preparation arrangement of toasting and cooking grills serving as a basis for a "one setting" bun toasting method;

FIG. 2, is a section view taken on line 2—2, of FIG. 1, indicating in dotted lines, movement of a bun tray up an incline into an open space, with a tray remaining parallel to a bun toasting grill plate above as the space between them is decreased to a preset bun half compression distance maintained during toasting;

FIG. 3, is a partial front view of a movable bun tray taken along line 3—3 of FIG. 2, indicating: a roller and track arrangement; operating handle; and matching height of the movable bun tray with the height of an adjacent cooking grill;

FIG. 4 is a partial sectional view taken along line 4—4 of FIG. 2 looking down at one side of a latch and stop mechanism used in positioning a movable bun tray; and FIG. 5 is a side elevation, with portions broken away in sections to show another arrangement of toasting grill plates serving as the basis for a "one setting" bun toasting operation.

DESCRIPTION OF ONE PREFERRED EMBODIMENT OF EQUIPMENT

In FIGS. 1 through 4, a preferred embodiment of an arrangement of toasting and cooking grill equipment 10 is shown which is used during a "one setting" bun toasting hamburger preparation operation. Packaged, prebaked buns, precut through their mid circular plane are generally provided directly to a "Drive-In" food serving business. Upon removal from their packages stored nearby the principal cooking grill, these halves during practice of this invention and using this equipment, are placed for toasting on a "one setting" basis as follows.

Referring to FIG. 1, top halves 14 of hamburger buns are placed on a toasting grille plate 16 to the left of a meat pattie cooking grill 18 with their interior cut surface positioned face down upon grille plate 16. Over a grouping of top halves a preset compression lid 22 is pivoted about its hinge 24 into a parallel position with the surface of toasting grille plate 16 equipped with a handle 26 of substantial weight. Construction of hinge 24 and lid 22 includes stops (not shown) positively limiting lid travel so bun half compression forces are only effective up to and at this limiting lid travel position.

Adjacent to this top half bun toasting grille assembly 30 is a cooking grill 18, preferably of like size and height. Then to its right, is a tray 34, also of like size and height on which bottom halves 36 of buns are arranged with their cut surfaces up. As shown in more detail in FIGS. 2 and 3, tray 34 is part of a traveling chassis 38. Chassis 38 is greater in depth at one end 40, which is located during bun loading in a flush position with all respective aisle edges of toasting grille plate 16, cooking grille 18 and tray 34. The shallower depth opposite end 42 of chassis 38 is located at the tray edge which matches terminal edges of both grill plate 16 and cooking grille 18. These edges, as combined, become a continuous edge of preparation surface that is arranged parallel to an aisle in which personnel stand during efficient preparation of toasted bun hamburgers using this equipment.

Variable depth chassis ends 40, 42 accommodate positioning of rotatably mounted wheels 46 along inclined tracks 48 completing the movable support of tray 34. As shown in FIG. 2, tray 34 is held at all times horizontal position so any initial spaced setting of bottom bun halves remains until a completed hamburger is then removed from tray 34.

When tray 34 is loaded to full capacity or a percentage thereof and toasting of bottom bun halves 36 is wanted, chassis 38 is moved up inclined tracks 48 into an oven space 50. A cross bar handle 52 is provided on chassis 38 for this purpose as shown in greater detail in FIG. 4. Whenever such movement occurs, latch mechanism 54 is operated to retract laterally projecting stops 56 clearing them from paths of upper latch keepers or abutments 58. Compression of a raised hand grip portion 60 of crossbar 52 against force of springs 62 causes pivoting of rocker arms 64 which, in turn, pull in projecting stops 56.

After chassis 38 is completely raised along tracks 48 into oven space 50, release of hand grip portion 60, allows spring force to reverse the direction of pivoting rocker arms 64 and their respective connecting rods 66 thereby moving projecting stops 56 into abutting alignment with upper latch keepers or abutments 58. The chassis 38 remains in this position while bottom halves of buns 36 that are arranged on tray 34 are being toasted.

As shown in FIG. 2, with dotted lines, this toasting position of tray 34 on chassis 38 places cut interior surfaces of bottom bun halves 36 in controlled compression contact with heated grill 70 located directly over them. When bun sizes are substantially changed latch keepers 58 are reset to maintain the best preset compression required to excellently toast these cut interior surfaces of bottom halves 36.

Tracks 48 are secured to supporting structure 44 by fasteners 45. This supporting structure 44 may be in whole or in part also used in fabricating toasting grill assembly 30 and/or cooking grill 18. Moreover, to increase utilization of the heat of toasting grill 70 and to keep its intermediate startup cycling times down to a minimum, supporting structure 44 or like structure used in positioning toasting grill 70 is formed into an open entry oven space 50, having an insulated top 72, sides 74 and back 78.

A timer 80 is placed at top 72 of oven space 50 to be set and reset conveniently for bun toasting operations. Upon completion of a timing cycle, at a given interval, latch mechanism 54 is operated manually to remove tray 34 and toasted bottom halves of buns 36 from oven space 50 back down to common level of grills 16 and 18. The tray remains at this level as lateral projecting stops 56 contact lower latch keepers or abutments 82. Complete removal of tray 34 and chassis 38 for cleaning and adjustments is easily undertaken by depressing raised hand grip portion 60 of crossbar 52 causing withdrawal of laterally projecting stops 56 to clear these lower latch keepers or abutments 82. Although not shown, a lip or stop may be installed at the lower end of the inclined tracks to keep the tray 34 from inadvertently running out into the aisle if the latch stuck or an operator failed to reposition the latch after starting the removal of the tray 34 from the over space 50.

Referring to FIG. 1, after commencing cooking of meat patties on cooking grill 18, the additional preparation steps concerning efficient bun toasting involve placing top halves 14 with their cut surfaces down at selected locations on heated grill plate 16 and lowering preset compression lid 22 for a selected time interval, placing an equal number of bottom halves 36 with their precut surfaces up at spaced locations about tray 34 and moving chassis 38 into oven space 50 for preset compression toasting for a selected time interval, raising lid 22 and placing toasted bun halves 14 on cooking meat patties 84, placing combined bun top halves 14 and cooked patties 84 on toasted bottom halves 36 after their removal on tray 34 from oven space 50, removing combined bun halves 14 and 36 and respective covered meat patties 84 from tray 34 for serving to customers.

DESCRIPTION OF ANOTHER PREFERRED EMBODIMENT OF EQUIPMENT

In FIG. 1 an expansive left to right sequence of preparing and assembling toasted bun hamburgers is shown. Counter space limitations may require a different directional sequence or a difference may be required because of other reasons. An example of such a different directional sequence or equipment position change is illustrated in FIG. 5. Open entry oven space 50 and toasting grill 70 above with their like appurtenances are again utilized at the same sizes or other selected sizes following like or similar porportions. However, in lieu of insulated top 72 of oven space 50, a toasting grill plate 86 is placed immediately above toasting grill plate 70. Then on this grill plate 86, top halves 14 are toasted while held in preset compression by lid 88 with its weighted handle 90.

In this embodiment these grill plates may be heated efficiently with the same heating element. The need and use of only one element reduces the initial equipment costs and operating costs.

Preset compression is determined by this combined weight lid 88 and its handle 90. The limit of such compressive lid travel is determined by a selected original depth of side flanges 92 of lid 88 which contact edges of grill plate 86, keeping the compressive lid surface at this flange distance above grill plate 86. Parallel contact of side flanges 92 with grill plate 86 is controlled by using offset hinge 94 having its axis 96 located above the compressive surface of the closed lid 88. As shown in FIG. 5, axis 96 of hinge 94 is located at the top of handle 90 when it is in the compressive closed position.

Such preset compression is also determined in like manner with reference to top half bun toasting grill assembly 30 shown in FIG. 1. Its hinge 98 and side flanges 100 serve the same purpose of limiting compressive lid travel.

Referring to FIG. 5, after commencing cooking of meat patties on a cooking grill, not shown in FIG. 5, located adjacent to tray 34, the additional steps concerning efficient bun toasting involve placing top halves 14 with their cut surfaces down at selected locations on heated grill plate 86 and lowering preset compression lid 88 for a selected time interval, placing an equal number of bottom halves 36 with their cut surfaces up at spaced locations about tray 34 and moving chassis 38 into oven space 50 for preset compression toasting for a selected time interval, raising lid 88 and placing toasted bun top halves 14 on cooking meat patties 84, placing combined bun top halves 14 and cooked patties 84 on toasted bottom halves 36 after their removal on tray 34 from oven space 50, removing combined bun halves 14 and 36 and respective covered meat patties 84 from tray 34 for serving to customers.

OTHER CONSIDERATIONS REGARDING EQUIPMENT SIZES AND MATERIALS

In the embodiment of FIG. 1, working or arm reaching depth of grills 16 and 18 and tray 34 is maximum. Bun halves 36 in open space 50 are out of reach. Therefore in this embodiment, oven space 50 is generally built into counters and equipment which are used by persons in a parallel aisle who are directly serving customers completing their orders with selected beverages and deserts.

In the embodiment of FIG. 5, although for clarity of preceeding descriptions, tray 34 and oven space 50 were again designated by same numerals, as a practical consideration proportions used with respect to tray 34 and grill 86 are determined by available arm reaching distance of a person who is cooking hamburgers. For in this embodiment he must be able to place and remove top bun halves 14 with respect to their toasting on grill plate 86. To meet this operational objective, length of tray 34 and grill plate 86 parallel to a cooking aisle is increased as the working or reaching depths of tray 34 and grill plate 86 are reduced, thereby keeping the overall available toasting surfaces on a par with an arrangement as shown in FIG. 1.

Preferably, toasting grills 16, 70 and 86 are made of a ¼-inch thick polished steel plate placed over "Chromolox"$_{TM}$ electrical strip heaters. Insulated top 72, sides 74, back 76, of oven spaces are formed of spaced stainless steel panels filled with styrofoam insulation. Tray 34 is also made of stainless steel and reinforced underneath, as necessary, to prevent buckling.

Temperature ranges and heating capacities of respective grill plates 16, 18, 70 and 86 and their timed utilization during preparation of toasted bun hamburgers is initially established so all preparation steps are efficiently undertaken in the sequence of "one setting" of bun halves 14, 36 without any danger of excessive or inadequate toasting of bun halves 14, 36 and of over or under cooking of meat patties 84.

In each equipment installation of these associated grills, wherein trays move bottom bun halves into oven space topped by toasting grills, this "one setting" of bun halves is undertaken. Such "one setting" preparation reduces bun handling motions to an efficient minimum while obtaining superior toasting results with preset compression toasting equipment.

I claim:
1. Hamburger bun toasting equipment for "one setting" of top and bottom halves of buns during multiple preparations of hamburgers during a specific cooking run, comprising:
  a. a top half bun toasting grill arranged to receive top halves with their cut interior surface facing downwardly on the exposed surface of this toasting grill, a hamburger cooking grill, said toasting grill being mountable and operable in close proximity to a cooking grill on which hamburger patties are being cooked;
  b. a cover for the said top bun toasting grill having sufficient weight to compress top halves of buns into sufficient contact with the grill surface to obtain better toasting;
  c. an assembly of a movable tray, elevation increasing guide and support means for said tray and an above positioned toasting grill, also mountable and operable in close proximity to said cooking grill on which hamburger patties are being cooked; the movable tray receiving bottom halves of buns with their cut interior surface facing upwardly and when so loaded the tray is moved so the cut interior surfaces of the bottom halves contact the above positioned toasting grill;

2. Hamburger bun toasting equipment for "one setting" of buns, as claimed in claim 1, wherein the above positioned toasting grill is covered above and around at least three sides by depending portions to form an open end oven space heated by the said toasting grill.

3. Hamburger bun toasting equipment for "one setting" of buns, as claimed in claim 1 wherein the said elevation increasing guide and support means, controls movement of the tray so it remains parallel to the surface of the said toasting grill.

4. Hamburger bun toasting equipment for "one setting" of buns, as claimed in claim 1, wherein the top half bun toasting grill is located on a level at which the movable tray is loaded.

5. Hamburger bun toasting equipment for "one setting" of buns, as claimed in claim 1, wherein the top half bun toasting grill is located on top of the bottom half bun toasting grill.

6. Hamburger bun toasting equipment for "one setting" of buns, as claimed in claim 1, one heating means to heat both top half bun toasting grill and and the bottom half bun toasting grill.

7. Hamburger bun toasting equipment for "one setting" of top and bottom halves of buns during multiple preparations of hamburgers during a specific cooking run, comprising:
 a. a top half bun toasting grill arranged to receive top halves with their cut interior surface facing downwardly on the exposed surface of this toasting grill mountable and operable in close proximity to said cooking grill on which hamburger patties are being cooked;
 b. an assembly of a movable tray and an above positioned toasting grill, also mountable and operable in close proximity to said cooking grill on which hamburger patties are being cooked; the movable tray receiving bottom halves of buns with their cut interior surface facing upwardly and when so loaded the tray is moved so the cut interior surfaces of the bottom halves contact the above positioned toasting grill;
 c. an elevation increasing guide and support means for the movable tray comprising tracks mounted on an incline and a chassis and wheel assembly to support the tray as it is moved up the inclined tracks.

8. Hamburger bun toasting equipment for "one setting" of buns, as claimed in claim 7, wherein a latching assembly is principally carried by the chassis and operates to laterally expand into the path of stops which are located near the top of the tracks and secured to depending structure supporting the said grill for toasting the bottom bun halves.

9. Toasted bun hamburger preparation equipment for "one setting" of respective top and bottom halves of buns cut through their centers, comprising:
 a. toasting grill to receive top halves of buns with their cut face down, and a weighted cover, pivotally mounted for movement over this toasting grill, equipped with a spacing means to limit the compressive final travel of this cover so top bun halves will be held firmly and uniformly against this toasting grill yet without crushing the top bun halves assuring the toasting will be uniform;
 b. cooking grill to receive meat patties located adjacent to the toasting grill; and
 c. toasting grill, oven, and compressive parallel movement tray sub assembly, to toast bottom halves of buns with their cut face being positioned upwardly as they are arranged on the parallel movement tray, this subassembly being located adjacent to the cooking grill on which the meat patties are being cooked, the toasting grill being surrounded on at least three sides by depending structures forming the oven, elevation increasing guiding and supporting means to be used during parallel movement of the tray carrying the bottom halves of the buns into firm toasting contact with said subassembly toasting grill located within the oven formed by the sides of said depending structures.

10. Toasted bun hamburger preparation equipment for "one setting" of respective top and bottom halves of buns cut through their centers, as claimed in claim 9 wherein the toasting grill to receive top halves of buns is located immediately above the toasting grill, oven, and compressive parallel movement subassembly that receives the bottom halves of buns.

11. Toasted bun hamburger preparation equipment for "one setting" of respective top and bottom halves of buns cut through their centers, as claimed in claim 10, wherein the toasting grill for the top halves of buns and the toasting grill for the bottom halves of buns have a common heating means.